United States Patent

Ward et al.

[11] Patent Number: 6,064,169
[45] Date of Patent: *May 16, 2000

[54] MOTOR AMPLITUDE CONTROL CIRCUIT IN CONDUCTOR-ON-INSULATOR TUNING FORK GYROSCOPE

[75] Inventors: Paul A. Ward, Roslindale; Anthony S. Kourepenis, Acton; Marc S. Weinberg, Needham, all of Mass.

[73] Assignee: The Charles Stark Draper Laboratory, Inc., Cambridge, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/540,809

[22] Filed: Oct. 11, 1995

[51] Int. Cl.$^7$ ............................. H03B 5/30; G05D 15/00
[52] U.S. Cl. .......................... 318/646; 318/640; 331/1 A; 331/35
[58] Field of Search ...................... 318/646, 638, 318/650, 648, 649, 128, 114; 310/328, 326, 370, 367; 73/504.14, 505, 510, 517, 651, 654, 543, 861.357, 861.355, 504.16, 504.12, 861.356, 504.04; 331/1, 36, 116, 27; 702/104, 70, 65

[56] References Cited

U.S. PATENT DOCUMENTS

| 3,636,810 | 1/1972 | Reefman . | |
|---|---|---|---|
| 3,686,213 | 8/1972 | Staudte | 310/370 |
| 3,743,960 | 7/1973 | Steudel | 331/36 |
| 4,127,028 | 11/1978 | Cox et al. | 73/861.355 |
| 4,385,473 | 5/1983 | Aoki et al. | 310/312 |
| 4,577,164 | 3/1986 | Grib | 318/128 |
| 4,852,409 | 8/1989 | Herzl | 73/861.356 |
| 5,050,439 | 9/1991 | Thompson | 73/861.356 |
| 5,383,362 | 1/1995 | Putty et al. | 73/505 |
| 5,444,641 | 8/1995 | White | 364/484 |
| 5,505,084 | 4/1996 | Greiff et al. | 73/504.14 |
| 5,585,562 | 12/1996 | Kurata et al. | 73/504.16 |

*Primary Examiner*—Paul Ip
*Attorney, Agent, or Firm*—Weingarten, Schurgin, Gagnebin & Hayes LLP

[57] ABSTRACT

A control system for a tuning fork gyroscope uses motor frequency to control motor amplitude. The tuning fork gyroscope has a drive signal input and an output signal from which motor frequency is determined. A phase/frequency detector generates an error signal by comparing the actual oscillation phase of the output signal with the phase of a reference signal from a crystal controlled frequency synthesizer. The error signal is filtered in a feedback loop control to reduce phase detector ripple. The output of the loop controller is then used to determine the appropriate drive signal to drive the error signal to a constant and maintain a predetermined oscillation frequency.

9 Claims, 2 Drawing Sheets

MOTOR AMPLITUDE CONTROL CIRCUIT IN CONDUCTOR-ON-INSULATOR TUNING FORK GYROSCOPE

TECHNICAL FIELD

This invention relates generally to tuning fork gyroscopes, and more particularly to an improved circuit for controlling motor amplitude in a tuning fork gyroscope.

BACKGROUND OF THE INVENTION

The basic theories of operation and construction of tuning fork gyroscopes are now fairly well known. Typically, tuning fork gyroscopes, as shown in U.S. Pat. No. 5,349,855 entitled COMB DRIVE MICROMECHANICAL TUNING FORK GYROSCOPE, issued to Bernstein et al., include silicon proof masses which are suspended by support flexures above a glass substrate, and comb electrodes which are used for driving an oscillation of the proof masses. Metallic sense electrodes are disposed on the glass substrate below the proof masses for detecting Coriolis acceleration by indicating differential out-of-plane amplitude. Because tuning fork gyroscopes operate in this manner, it is desirable that the amplitude of the oscillation be held at a predetermined constant in order to provide a more accurate output indicating rate.

Prior to the present invention, the amplitude of the oscillating motor of tuning fork gyroscopes has been controlled by a conventional servo loop. In this technique motor position is converted to a proportional voltage by measuring charge variation on a capacitive pick-off which is biased with a DC voltage. The resulting motor position signal is amplified and detected by a full wave rectifier. The rectifier output is then filtered, and the filtered voltage compared against a reference voltage; the difference forming an error voltage. This error voltage is then applied to the motor drive actuator through a loop controller to adjust motor amplitude such that error is driven to zero. However, this particular technique has a potential drawback.

This conventional servo loop may have some instability in the motor position pick-off. The sensitivity of the DC biased pick-off varies slowly over time due to a spurious charge build up on the glass substrate beneath the pick-off electrodes. As this charge accumulates on the glass the sensitivity of the position pick off is modified. In response, the loop controller calls for modified drive force to compensate. The result is a motor amplitude transient wherein amplitude changes over time as substrate charge accumulates. This will result in lower accuracy than is otherwise possible because of the relationship between motor amplitude and Coriolis force in the system.

SUMMARY OF THE INVENTION

An object of the present invention is to provide an improved motor amplitude control circuit for a tuning fork gyroscope.

Another object of the present invention is to provide stable motor amplitude in a tuning fork gyroscope.

Yet another object of the present invention is to provide a tuning fork gyroscope with a stable gyro scale factor.

According to the present invention, a control system for a tuning fork gyroscope uses motor frequency to control motor amplitude.

A primary feature of the present invention is a circuit which allows the application of DC motor readout bias so that a signal which is proportional to motor position is produced for motor regeneration and sense demodulation by using a separate parameter, viz., motor frequency, as an indication of motor amplitude. By using motor frequency the present invention advantageously increases the accuracy of the prior art with a circuit which is simple and cost effective to implement. The frequency of the motor is not effected by substrate charging and is indicative of motor amplitude according to a stable relationship at a fixed temperature. Motor frequency and a reference frequency can be matched using a phase/frequency detector. The tuning fork gyroscope can thus be controlled without compensating for the spurious charge buildup on the glass substrate.

BRIEF DESCRIPTION OF THE DRAWING

The foregoing objects and features of this invention may be more fully understood from the following detailed description of the invention in which.

DETAILED DESCRIPTION OF THE DRAWING

Figure 1:
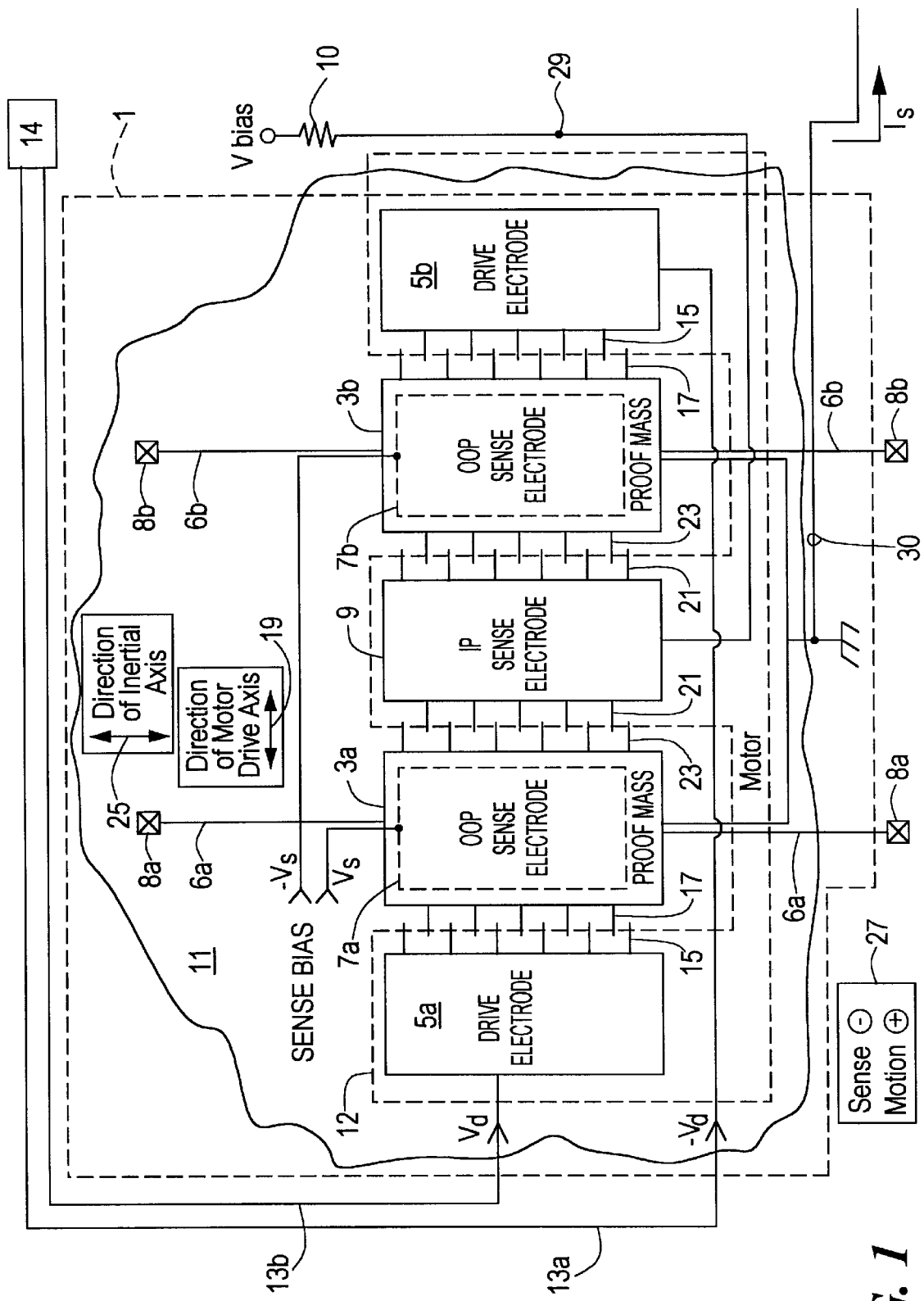
FIG. 1 is a schematic/block diagram of a tuning fork gyroscope according to the present invention.

Referring to FIG. 1, a tuning fork gyroscope 1 includes a pair of proof masses 3a, 3b, a pair of drive electrodes 5a, 5b, a pair of out-of-plane sense electrodes 7a, 7b, and an in-plane sense electrode 9. The tuning fork gyroscope 1 also includes a glass substrate 11 on which the out-of-plane sense electrodes are disposed. The proof masses 3a, 3b are supported on flexures 6a, 6b between in-plane sense electrode 9 and the out-of-plane sense electrodes 7a, 7b. The proof masses 3a, 3b, are suspended by support flexures 6a, 6b attached at points 8a, 8b to substrate 11 which permit movement of the proof masses relative to the in-plane sense electrode 9, the out-of-plane sense electrodes 7a, 7b, and the substrate.

The operation of the tuning fork gyroscope is electro-mechanical in nature. Drive signals 13a, 13b are provided from source 14 to the drive electrodes 5a, 5b, respectively, as shown. The drive electrodes 5a, 5b include a plurality of comb-like electrodes 15 extending therefrom and toward an adjacent one of the proof masses 3a, 3b. Similarly, the proof masses 3a, 3b have comb-like electrodes 17 extending toward the adjacent one of the drive electrodes 5a, 5b and interleaved with the electrodes 15 of the corresponding drive electrode. As such, the electrostatic coupling of the drive signals 13a, 13b to the corresponding proof masses 3a, 3b by the drive electrodes 5a, 5b imparts vibration to the proof masses in the plane of the tuning fork gyroscope 1 and in the directions indicated by arrow 19 labelled "motor drive." At resonance, the proof mass displacement lags the drive force by ninety-degrees.

The in-plane sense electrode 9 is disposed between the two proof masses 3a, 3b and has comb-like electrodes 21 extending from opposite sides thereof toward the adjacent one of the proof masses. Each of the proof masses has similar electrodes 23 extending toward the in-plane sense electrode 9 and interleaved with the electrodes 21 of the in-plane sense electrode 9, as shown. A bias signal, $V_{bias}$, is coupled to the in-plane sense electrode 9 through an impedance 10 to enable detection of charge variations caused by displacement of the proof masses 3a, 3b in the plane of vibration.

In response to an inertial input, and specifically to a rotational rate about an input axis coplanar to the plane of vibration (labelled inertial axis 25), the proof masses 3a, 3b deflect out of the plane of vibration, i.e., along an output axis orthogonal to the input axis as labelled sense motion 27. Such out-of-plane deflection of the proof masses 3a, 3b occurs at a frequency corresponding to the drive axis resonant frequency of the proof masses and with an amplitude corresponding to the input rotational rate. Thus, detection of the out-of-plane deflection of the proof masses 3a, 3b provides a measure of the rotational rate.

The out-of-plane sense electrodes 7a, 7b receive a DC voltage $V_S$, $-V_S$ (labelled "sense bias") for establishing a potential difference so that a change in the capacitance between the electrodes 7a, 7b and the adjacent proof masses 3a, 3b results in a change in charge on the proof masses 3a, 3b. An output signal 30 from the proof masses is thus indicative of the anti-parallel out-of-plane deflection of the tuning fork gyro.

The tuning fork gyroscope works on the principle of Coriolis force. The proof masses 3a, 3b are driven in-plane at their resonant frequency. The drive electrodes 5a, 5b and the in-plane sense electrode 9 can be thought of as a motor, with motor amplitude being the peak magnitude of physical deflection of the proof masses and motor frequency being the oscillation frequency of the motor. If the frequency and the amplitude of in-plane oscillation are large, the result is large in-plane velocity. In the presence of a rotation of the device about an axis orthogonal to the in-plane velocity but still coplanar, an out-of-plane force is produced on each proof mass. This effect can be represented mathematically as follows:

$$F_c = 2m\overline{\Omega} \times \overline{V} \qquad \text{Eq. 1}$$

Where
  m is the mass
  $\overline{V}$ is the proof mass velocity and
  $\overline{\Omega}$ is the input rate.

Because the two proof masses exhibit anti-parallel, in-plane oscillation, their velocity vectors are in opposite directions and the out-of-the-plane Coriolis induced forces are anti-parallel. Anti-parallel out-of-plane forces displace the proof masses out-of-plane in proportion to the value of the sense axis transfer function evaluated at the oscillation frequency. This sense axis motion can be detected by measuring the charge variation of the proof masses when a bias is applied to the sense electrodes. For these reasons, velocity must be held constant in order to accurately measure input rate.

Because the proof mass flexures are non-linear, i.e., the restoring force is a non-linear function of displacement, the natural frequency of the system will depend on the motor amplitude. That is, the natural frequency will increase with increasing oscillation amplitude, and will depend on both the amplitude and temperature for a given device in general. The natural frequency is a function of motor amplitude and motor temperature:

$$\omega_o = f(P, T) \qquad \text{Eq. 2}$$

Where
  P is motor amplitude and
  T is motor temperature.
The velocity amplitude is the product of frequency and position amplitude:

$$V = \omega P \qquad \text{Eq. 3}$$

It can be inferred that if both temperature and amplitude are constant, the natural frequency is constant. It therefore follows that if the temperature and frequency are held constant the amplitude will also be held constant. Based on these observations, it is possible to accomplish motor control. More specifically, if the spring restoring force includes a linear term and a cubic term, that is if:

$$f_x(x) = K_1 x + K_3 x^3 \qquad \text{Eq. 4}$$

the resonant frequency, defined as the frequency at which the displacement lags the applied force by 90 degrees, is given by:

$$\omega_o = \sqrt{\frac{(K_1 + 3/4 K_3 P^2)}{m}} \qquad \text{Eq. 5}$$

where P is the motor amplitude. At a fixed temperature, the spring stiffness coefficients are constant, and it is clear that the motor resonance frequency and amplitude are uniquely interdependent.

Figure 2:
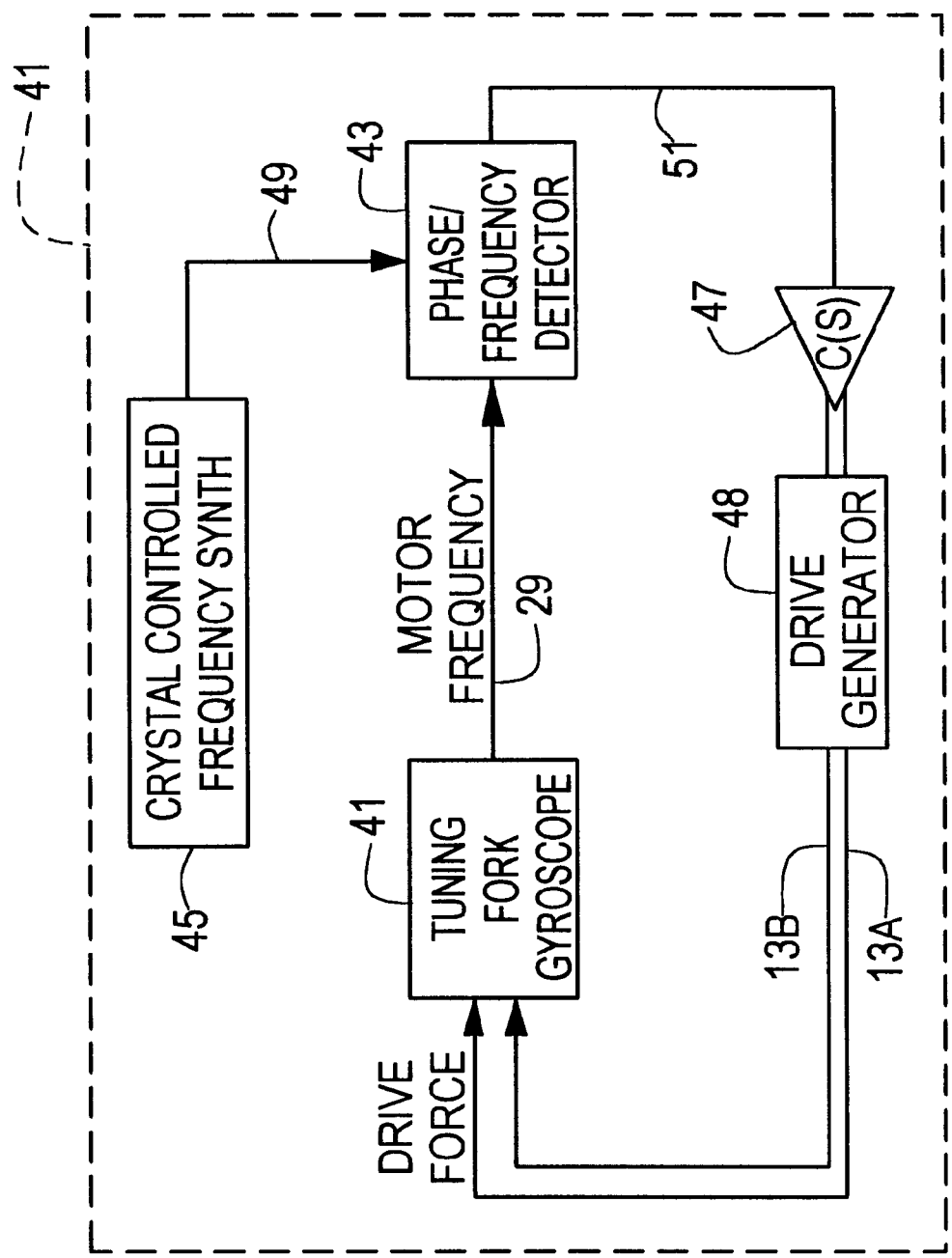
FIG. 2 is a block diagram of a control circuit for a tuning fork gyroscope such as that shown in FIG. 1.

FIG. 2 is a block diagram of a tuning fork gyroscope control circuit 41 for use with a tuning fork gyroscope such as that shown in FIG. 1. The system includes the tuning fork gyroscope 41, a phase/frequency detector 43, a crystal controlled frequency synthesizer 45 and a feedback loop control 47.

The circuit provides an automatic control system which uses the output signal 29 to control motor amplitude. As a technical matter, phase rather than frequency is used to accomplish the control (frequency being the rate of change of phase). The output signal 29 from the in-plane sense electrode 9 (FIG. 1), which is indicative of the actual oscillation phase of the proof masses, is received by the phase/frequency detector 43. The frequency synthesizer is operative to provide a predetermined reference phase signal 49. The phase/frequency detector is operative to compare the reference phase signal 49 with the output signal and provide an error signal 51 which is related to the phase difference between the output signal and the reference signal. The error signal 51 is outputted from the phase/frequency detector and received in the feedback loop control. The feedback loop control operates on the error signal by means of filtering and amplifying to provide a signal to drive generator 48 which provides drive force signals 13a, 13b which are received by the tuning fork gyroscope. The circuit adjusts the drive force signals until the error signal is driven to a constant. When the error signal (phase) is constant, the frequency difference is zero.

The phase/frequency detector is operative to provide a phase error signal which is related to the difference between the actual oscillation phase of the proof masses and the predetermined reference phase. The phase/frequency detector is a phase detector with an aperiodic transfer function, i.e., it provides a well defined error when the phase grows outside of the $0-2\pi$ range (when the frequency error is non-zero). To accomplish motor control, the phase error is driven to a constant such as $\pi$. When the phase error is constant, the frequency difference (error) is zero.

The feedback loop control provides drive signals which drive the phase error signal to a constant. The loop control receives the error signal from the phase/frequency detector. The loop control is proportional with lead, and may include other control laws as well as filtering to reduce phase detector ripple.

Further modifications of the invention herein disclosed will occur to persons skilled in the art, and all such modifications are deemed to be within the scope of the present invention as defined by the appended claims.

What is claimed is:

1. An apparatus for controlling motor amplitude in a tuning fork gyroscope that is driven by a motor and produces an output signal having an output phase indicative of a motor frequency, which is a function of motor amplitude, comprising:

a controller circuit having:
   a reference phase; and
   a phase/frequency detector operative to provide a phase difference signal representing phase difference between said output phase and said reference phase;
a filter for filtering said phase difference signal to provide a filtered signal adapted to reduce phase detector ripple to a drive generator in a feedback control loop;
said controller circuit responsive to said phase difference signal to provide drive signals from said drive generator to the tuning fork gyroscope, the drive signals controlled by said controller to maintain said phase difference signal constant, thereby to drive motor amplitude to a predetermined value.

2. The apparatus of claim 1 wherein said controller circuit further comprises:

a reference frequency generator coupled with said phase/frequency detector circuit, and which generates the reference frequency, wherein
a feedback loop controller that is coupled with said phase/frequency detector circuit and is operative in response to the difference between the reference frequency and the motor frequency to adjust the drive signal amplitude to achieve a predetermined motor amplitude.

3. The apparatus of claim 2 wherein said phase difference signal further comprises an error signal indicative of the difference between the reference frequency and the motor frequency, and wherein said feedback controller drives said error signal toward a zero value.

4. The apparatus of claim 3 wherein said reference frequency generator includes a crystal controlled frequency synthesizer.

5. A control system for achieving a predetermined motor amplitude in a tuning fork gyroscope that is driven by a motor and which generates an output signal having a frequency that is indicative of motor amplitude and further having an output phase, comprising:

a reference frequency generator that generates a reference frequency having a reference phase;
a phase/frequency detector that generates a phase difference signal that is indicative of the difference between the reference phase and the output phase;
a filter for filtering said phase difference signal to provide a filtered signal adapted to reduce phase detector ripple to a drive generator in a feedback control loop; and
wherein the drive signals are controlled by said controller to maintain said phase difference signal constant thereby to drive motor amplitude to a predetermined value.

6. The system of claim 5 wherein said reference frequency generator includes a frequency synthesizer.

7. The system of claim 6 further including a feedback loop controller that generates drive signals in response to said output signal that drive the difference between said reference frequency and said motor frequency to a zero value.

8. The system of claim 5 wherein said frequency detector is a phase-frequency detector.

9. The system of claim 5 wherein said frequency detector is a phase detector.

* * * * *

UNITED STATES PATENT AND TRADEMARK OFFICE
CERTIFICATE OF CORRECTION

PATENT NO. : 6,064,169
DATED : May 16, 2000
INVENTOR(S) : Paul A. Ward et al.

Page 1 of 1

It is certified that error appears in the above-identified patent and that said Letters Patent is hereby corrected as shown below:

Column 3,
Line 33, Equation 1, "$F_c = 2m\overline{\Omega}X\overline{V}$" should read -- $F_c = 2m\vec{\Omega}X\vec{V}$ --;

Line 36, "$\overline{V}$" should read -- $\vec{V}$ --;

Line 37, "$\overline{\Omega}$" should read -- $\vec{\Omega}$ --.

Signed and Sealed this

Twenty-sixth Day of March, 2002

Attest:

*Attesting Officer*

JAMES E. ROGAN
*Director of the United States Patent and Trademark Office*